(12) United States Patent
Suzuki

(10) Patent No.: US 7,266,906 B2
(45) Date of Patent: Sep. 11, 2007

(54) MEASURING TOOL

(75) Inventor: Masamichi Suzuki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/524,240

(22) Filed: Sep. 21, 2006

(65) Prior Publication Data

US 2007/0068027 A1 Mar. 29, 2007

(30) Foreign Application Priority Data

Sep. 28, 2005 (JP) .............................. 2005-281483

(51) Int. Cl.
*G01B 5/00* (2006.01)
(52) U.S. Cl. ............................ 33/784; 33/793; 33/806; 33/813
(58) Field of Classification Search .......... 33/783–784, 33/787–788, 705–707, 791–796, 806–807, 33/813–827
See application file for complete search history.

(56) References Cited

U.S. PATENT DOCUMENTS 4,035,922 A * 7/1977 von Voros ................... 33/784
4,420,887 A 12/1983 Sakata et al.
5,483,751 A 1/1996 Kodato
6,497,051 B1 * 12/2002 Poole et al. .................. 33/784
6,834,439 B2 * 12/2004 Matsumiya et al. .......... 33/706

FOREIGN PATENT DOCUMENTS

| DE | 35 27 661 A1 | 2/1986 |
| DE | 43 29 325 A1 | 3/1994 |
| EP | 0 644 397 A2 | 3/1995 |
| JP | Y 2-39202 | 10/1990 |
| JP | 2593029 B2 | 12/1996 |

* cited by examiner

*Primary Examiner*—Yaritza Guadalupe-McCall
(74) *Attorney, Agent, or Firm*—Oliff & Berridge, PLC

(57) ABSTRACT

A measuring tool has a slider (3) supported to a body frame (1) and a feeding mechanism (4) for moving the slider in axial direction. The feeding mechanism includes: an outer roller (41) rotatably supported to the body frame (1); a forward feed roller (42) disposed between the outer roller (41) and the slider (3) at a position closer to a forward side of the slider (3) relative to the outer roller (41); a reverse feed roller (43) disposed at a position on a reverse side; a roller holder (45) supporting these feed rollers to allow them to move along the circumference around the axis of the outer roller; a first leaf spring (44) that biases these feed rollers toward the slider side; and a power transmitter (46) connecting the outer roller (41) to these feed rollers to transmit the rotation of the outer roller to the feed rollers.

4 Claims, 7 Drawing Sheets

FORWARD DIRECTION

MEASURING TOOL

BACKGROUND OF THE INVENTION

1. Field of the Invention

The present invention relates to a measuring tool. More specifically, the present invention relates to a measuring tool in which a movable member is moved to hold a workpiece, where a dimension or a profile of the workpiece is measured from a displacement of the movable member.

2. Description of Related Art

There are conventionally known measuring tools in which a spindle thereof is moved in the axial direction to hold a workpiece, where a dimension or a profile of the workpiece is measured from the displacement of the spindle. Examples of such measuring tools include a micrometer (refer to, for example, U.S. Pat. No. 4,420,887, FIG. 9, FIG. 10, etc.).

The micrometer includes a U-shaped body frame, an anvil provided on one end of the body frame, a spindle supported on the other end of the body frame, the spindle being advanceable and retreatable relative to the anvil in the axial direction, and a feeding mechanism for feeding the spindle.

The feeding mechanism includes a rack provided on the spindle, a pinion meshed with the rack, an outer roller rotatably provided on the body frame and screwed to the pinion, and a coil spring that connects the outer roller and the pinion.

In such an arrangement, when the outer roller is rotated, the pinion screwed to the outer roller will rotate, and thereby the spindle is moved via the rack. When the workpiece is held by the anvil and the spindle, since the spindle can not be moved further, the pinion can not be rotated either. Herein, if only the outer roller is rotated, the coil spring will be wound. Thus, due to the reaction force of the coil spring applied to spindle, a specific measuring force caused by the reaction force of the coil spring will be applied to the workpiece. Further, the outer roller will abut on the body frame so as to be locked.

With such an arrangement, although the feeding mechanism configured by the rack and the pinion is used, the measurement can be conducted with a specific measuring force. Also, since the outer roller can be locked even when the user leaves his hand off the outer roller, slip of the spindle can be prevented.

Other advantages are that, for example, the thread cutting need not to be conducted at high accuracy compared to that of a typical micrometer (namely, a micrometer in which a male screw is formed on a spindle thereof and a female screw is formed on a body thereof) and the spindle can be moved at a high speed.

However, in the micrometer described in the above document, since the feeding mechanism is configured by the rack and the pinion, there will arise the following problem. Specifically, when performing assembling adjustment during manufacture, since positioning the rack and the pinion (for example, adjustment of a backlash) is difficult to do, the assembling work becomes time-consuming and labor-consuming.

To solve this problem, there is suggested a micrometer in which a feeding mechanism has a feed roller that abuts on the spindle, and the spindle is moved by rotating of the feed roller.

Example of such a feeding mechanism is the one which includes an outer roller rotatably supported to the body frame, a feed roller that can rotate around an axis parallel to the axis of the outer roller to move the spindle, a roller holder that holds the feed roller, a spring that presses the outer periphery of the roller holder so that the feed roller is biased toward a direction in which its outer peripheral face is brought into contact with the spindle, a main gear provided on the outer roller, and a sub-gear provided on the feed roller and meshed with the main gear provided on the outer roller, the sub-gear transmitting the rotation of the outer roller to the feed roller.

The feed roller is disposed between the outer roller and the spindle at a position remote from the anvil relative to the outer roller. The roller holder is provided on the body frame in a manner rotatable around the axis of the outer roller.

In such an arrangement, when the outer roller is rotated, the feed roller will rotate, and thereby the spindle abutting on the feed roller will move in the axial direction.

With such an arrangement, since the work of positioning the rack and the pinion, which causes a problem in feeding mechanism configured by the rack and the pinion as shown in the document, is eliminated, the assembling adjustment during manufacture can be facilitated. Also, since the spindle is moved by rotating the feed roller, the spindle can be moved at high speed.

However, with the feeding mechanism having the aforesaid feed roller, since the spindle is moved by a common feed roller both when forward feed is performed for moving the spindle toward the side of the anvil and when reverse feed is performed for moving the spindle toward the side opposite to the anvil, there will arise the following problems.

The feed roller is pressed by the spring so as to be biased toward the direction in which the feed roller is brought into contact with the spindle, and is supported movably in that direction. Thus, when the outer roller is rotated in a forward direction, since a contact surface of a main gear of the outer roller presses a contact surface of a sub-gear of the feed roller toward a direction away from the spindle, the feed roller will be biased toward that direction.

Thus, even though the spindle can be smoothly moved by a biasing force of the spring when performing the reverse feed, in the case where the forward feed is performed, since a biasing force caused by the rotation of the outer roller in the forward direction is applied to the feed roller in an opposite direction to that of the biasing force of the spring, the feed roller will be moved in the direction away from the spindle, and thereby the spindle can not be smoothly moved.

Since the biasing force for pressing the outer periphery of the feed roller toward the spindle changes depending on whether the spindle is moved in the forward direction or in the reverse direction, good operability can not be achieved.

SUMMARY OF THE INVENTION

An object of the present invention is to provide a measuring tool in which a biasing force for biasing a feed roller toward a movable member does not change no matter whether the feed roller is forward fed or reverse fed, so that the movable member can be smoothly moved, and good operability can be achieved.

A measuring tool according to an aspect of the present invention includes: a U-shaped body frame; an anvil provided on one end of the body frame; a movable member supported on the other end of the body frame, the movable member being advanceable and retreatable relative to the anvil in the axial direction; and a feeding mechanism for feeding the movable member, the movable member being forward fed toward the anvil to hold a workpiece with the anvil and the movable member, where a dimension or a profile of the workpiece is measured from the displacement of the movable member; in which the feeding mechanism includes: an outer roller rotatably supported on the body frame; a forward feed roller disposed between the outer roller and the movable member at a position closer to the anvil relative to the outer roller, the forward feed roller being rotatable around an axis parallel to the axis of the outer roller to forward feed the movable member; a reverse feed roller disposed between the outer roller and the movable member at a position remote from the anvil relative to the outer roller, the reverse feed roller being rotatable around another axis parallel to the axis of the outer roller to reverse feed the movable member; a feed roller holding member provided on the body frame, the feed roller holding member supporting the forward feed roller and the reverse feed roller in a manner respectively movable along a circumference around the axis of the outer roller; a biasing mechanism that respectively biases the forward feed roller and the reverse feed roller in a direction in which outer periphery of the forward feed roller and the reverse feed roller comes into contact with the movable member; and a power transmitter that connects the outer roller to the forward feed roller and the reverse feed roller respectively, so that the rotation of the outer roller is transmitted to the forward feed roller and the reverse feed roller.

With such an arrangement, when the outer roller is rotated, the rotation of the outer roller will be transmitted by the power transmitter to the forward feed roller and the reverse feed roller. Since the forward feed roller and the reverse feed roller are supported by the feed roller holding member so that the forward feed roller and the reverse feed roller can respectively move along a circumference around the axis of the outer roller, and since the forward feed roller and the reverse feed roller are respectively pressed and biased by the biasing mechanism toward the movable member, actions of the forward feed roller and the reverse feed roller on the movable member will change in the following manner depending on the rotating direction of the outer roller.

First, when the outer roller is rotated in the forward direction, since a biasing force of the biasing mechanism and a biasing force caused by the rotation of the outer roller are applied to the forward feed roller in the same direction, the movable member will be forward fed by rotation of the forward feed roller.

The details will be described with reference to FIG. 6. FIG. 6 shows an example of the feeding mechanism of the present invention. In FIG. 6, the reference numeral 3 denotes the movable member, the reference numeral 41 denotes the outer roller, the reference numeral 42 denotes the forward feed roller, the reference numeral 43 denotes the reverse feed roller, the reference numeral 45 denotes the roller holder, the reference numeral 44 denotes the biasing mechanism, and the reference numeral 46 denotes the power transmitter. The power transmitter 46 may include a main gear 53 arranged on the outer roller 41 and sub-gears 47, 48 respectively arranged on the forward feed roller 42 and the reverse feed roller 43. Further, the forward feed roller 42 and the reverse feed roller 43 are respectively pressed and biased by the biasing mechanism 44 in the directions indicated by the arrows A0 and B0 against the movable member 3.

When the outer roller 41 is rotated in the direction indicated by the arrow A, the forward feed roller 42 will rotate in the direction indicated by the arrow A1. At this time, since a contact surface of the main gear 53 of the outer roller 41 presses a contact surface of the first sub-gear 47 of the forward feed roller 42 toward the side of the movable member 3, the forward feed roller 42 will be biased toward the direction in which the forward feed roller 42 is brought into contact with the movable member 3 (the direction indicated by the arrow A2). In this manner, since the biasing force caused by the rotation of the outer roller 41 (indicated by the arrow A2) is applied to the forward feed roller 42 in the same direction as that of the biasing force of the biasing mechanism 44 (indicated by the arrow A0), and since the forward feed roller 42 rotates, the movable member 3 will be forward fed in the direction indicated by the arrow A3.

Further, the reverse feed roller 43 rotates in the direction indicated by the arrow A4. Since a contact surface of the main gear 53 of the outer roller 41 presses a contact surface of the second sub-gear 48 of the reverse feed roller 43 toward a direction away from the movable member 3, the reverse feed roller 43 will be biased toward the direction away from the movable member 3 (the direction indicated by the arrow A5). In this manner, since the biasing force caused by the rotation of the outer roller 41 (indicated by the arrow A5) is applied to the reverse feed roller 43 in an opposite direction to that of the biasing force of the biasing mechanism 44 (indicated by the arrow B0), the reverse feed roller 43 will be moved in the direction away from the movable member 3. Thus, even if the reverse feed roller 43 rotates, it will not contribute to forward feeding the movable member 3.

When the outer roller 41 rotates in the direction opposite to the arrow A, since the forward feed roller 42 and the reverse feed roller 43 play roles opposite to those described above, the movable member 3 will be reverse fed when the reverse feed roller 43 rotates, and the forward feed roller 42 will not contribute to reverse feed of the movable member 3 even when the forward feed roller 42 rotates.

When performing measurement, the user holds the workpiece with the left hand, grasps the body frame of the measuring tool with the right hand and rotates the outer roller with the right thumb to move the movable member so that the workpiece is held by the movable member and the anvil. The dimension or the profile of the workpiece is measured from the displacement of the movable member at that point.

According to this aspect of the present invention, since the forward feed roller exclusively for performing forward feed and the reverse feed roller exclusively for performing reverse feed are provided, the biasing force of the biasing mechanism applied to the movable member will not change no matter whether the forward feed is performed or the reverse feed is performed. Thus, the movable member can be smoothly moved both in the forward direction and in the reverse direction.

Further, since the user holds the workpiece with the left hand, grasps the body frame of the measuring tool with the right hand and rotates the outer roller with the right thumb to move the movable member, the operation can be easily performed with one hand.

Further, since the forward feed roller and the reverse feed roller are constantly biased by the biasing mechanism toward the direction in which the forward feed roller and the reverse feed roller are brought into contact with the movable member, idle running caused by wear of the outer peripheral faces of the forward feed roller and the reverse feed roller can be prevented, and thereby there is no concern that the measurement can not be performed.

In the aforesaid measuring tool of the present invention, it is preferred that the power transmitter includes: a main gear provided on the outer roller; and sub-gears respectively provided on the forward feed roller and the reverse feed roller, the sub-gears engaging with the main gear, and that the biasing mechanism biases the forward feed roller and the reverse feed roller in circumferential direction of the axis of the main gear.

In such an arrangement, the forward feed roller and the reverse feed roller are respectively pressed and biased by the biasing mechanism toward the movable member in a circumferential direction of the axis of the main gear, and at the same time, the sub-gears of the forward feed roller and the reverse feed roller respectively engage with the main gear of the outer roller.

According to this aspect of the present invention, since being configured by the main gear and the sub-gears, the power transmitter can have a relatively simple structure as a power transmitter built in the feeding mechanism. Also, by being combined with the biasing mechanism, the outer peripheral faces of the forward feed roller and the reverse feed roller can be constantly biased toward the direction in contact with the movable member. Further, since there is no slip between the gears, the rotation of the outer roller can be securely transmitted to the forward feed roller and the reverse feed roller.

In the aforesaid measuring tool of the present invention, it is preferred that the feeding mechanism includes: an inner roller rotatably supported on the body frame; and a constant-pressure mechanism that connects the inner roller and the outer roller, the constant-pressure mechanism transmitting the rotation of the outer roller to the inner roller and allowing the outer roller to run idle relative to the inner roller when more than predetermined load is applied on the inner roller, and that the power transmitter connects the inner roller with the forward feed roller and the reverse feed roller respectively.

According to this aspect of the present invention, since the constant-pressure mechanism, which transmits the rotation of the outer roller to the inner roller and which allows the outer roller to run idle when a load applying on the inner roller exceeds a predetermined value, is provided, the user can perform the measurement with a constant measuring force.

In the aforesaid measuring tool of the present invention, it is preferred that the movable member has a rectangular cross section in a direction perpendicular to the longitudinal direction thereof, and that the forward feed roller and the reverse feed roller each have a trapezoidal groove on the outer circumference thereof, and two sides of the trapezoidal groove contact with two adjacent corners of the rectangular cross section of the movable member.

According to this aspect of the present invention, since two side surfaces of the trapezoidal groove formed on the outer periphery of each of the forward feed roller and the reverse feed roller respectively contact two adjacent corners of the rectangular cross section of the movable member, the forward feed roller and the reverse feed roller can constantly be positioned at the center of the movable member in the axial direction of the forward feed roller and the reverse feed roller. Thus the forward feed roller and the reverse feed roller can operate stably so as to smoothly move the movable member.

DETAILED DESCRIPTION OF PREFERRED EMBODIMENT(S)

An embodiment of the present invention will be described below with reference to the attached drawings.

Figure 1:
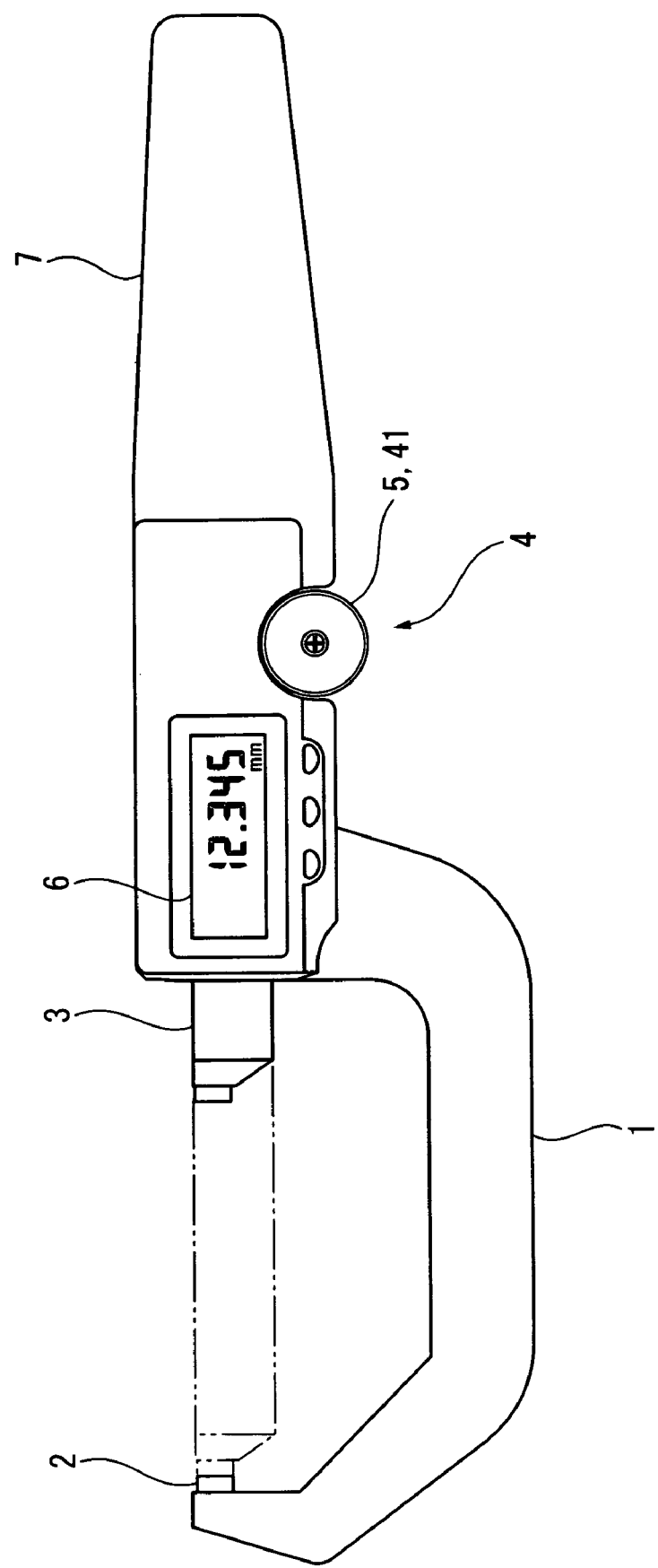
FIG. 1 is a front elevational view showing an embodiment of a measuring tool according to the present invention.
Figure 2:
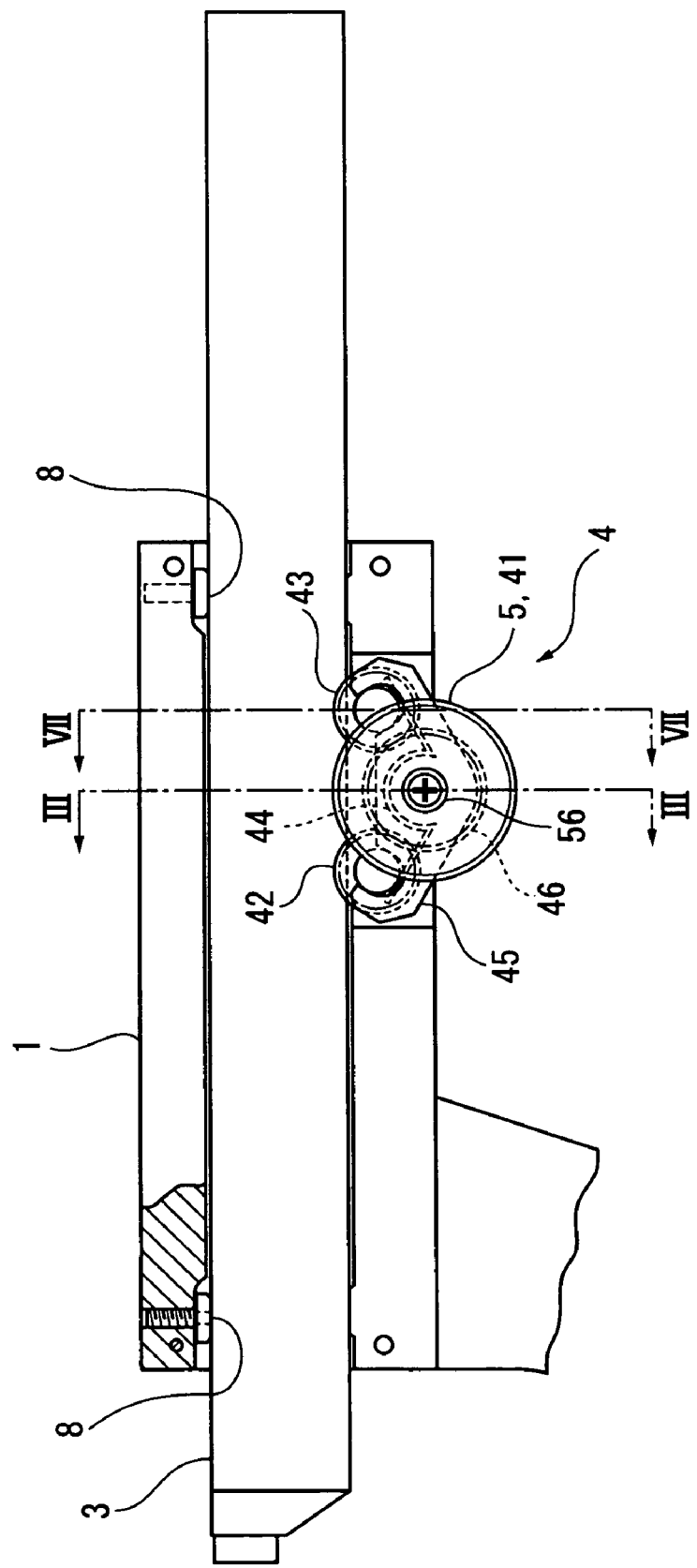
FIG. 2 is a partly enlarged view of a feeding mechanism of the above embodiment.
Figure 3:
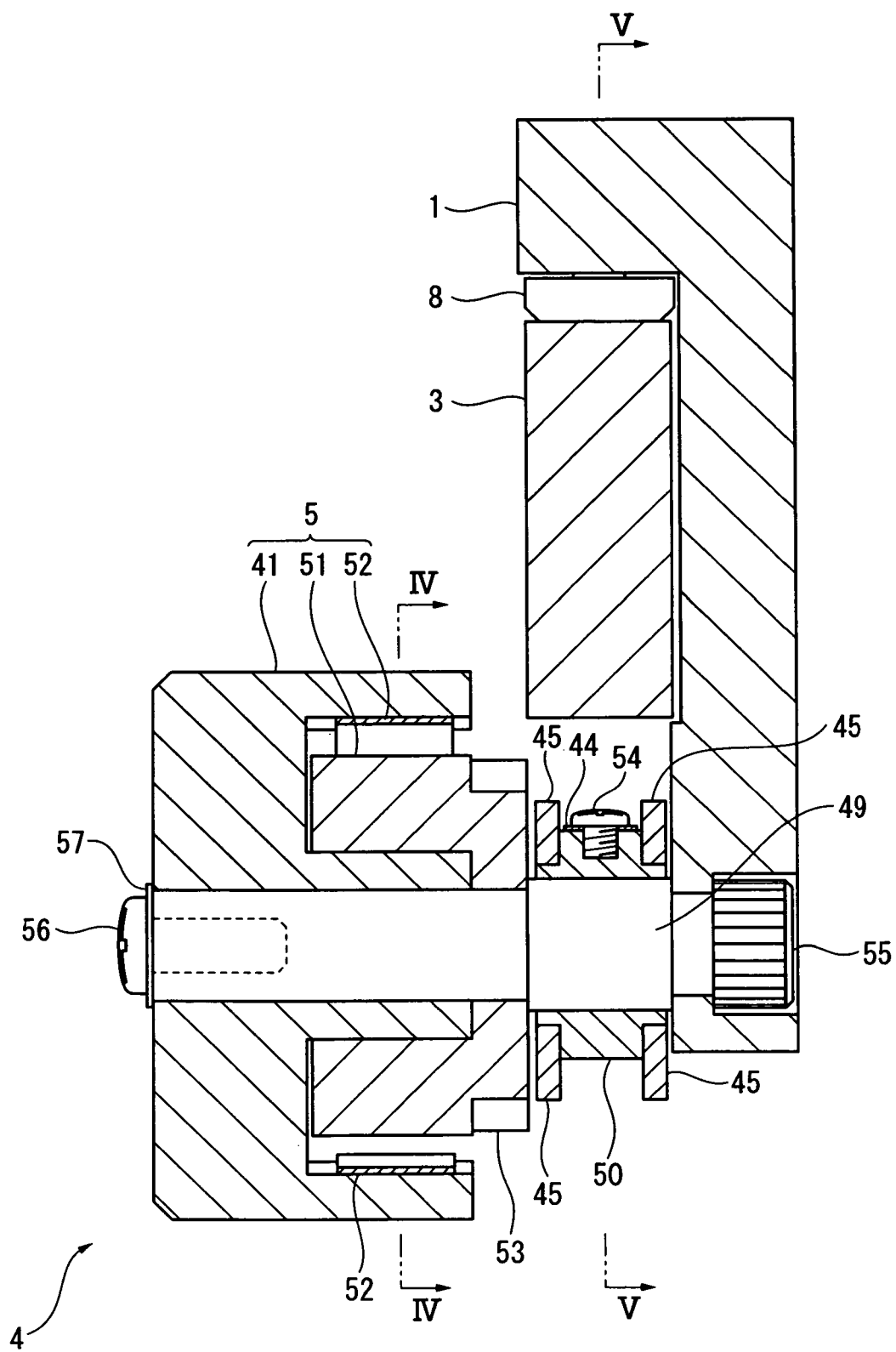
FIG. 3 is a cross section showing the feeding mechanism of the above embodiment, which is taken along line III-III of FIG. 2.
Figure 4:
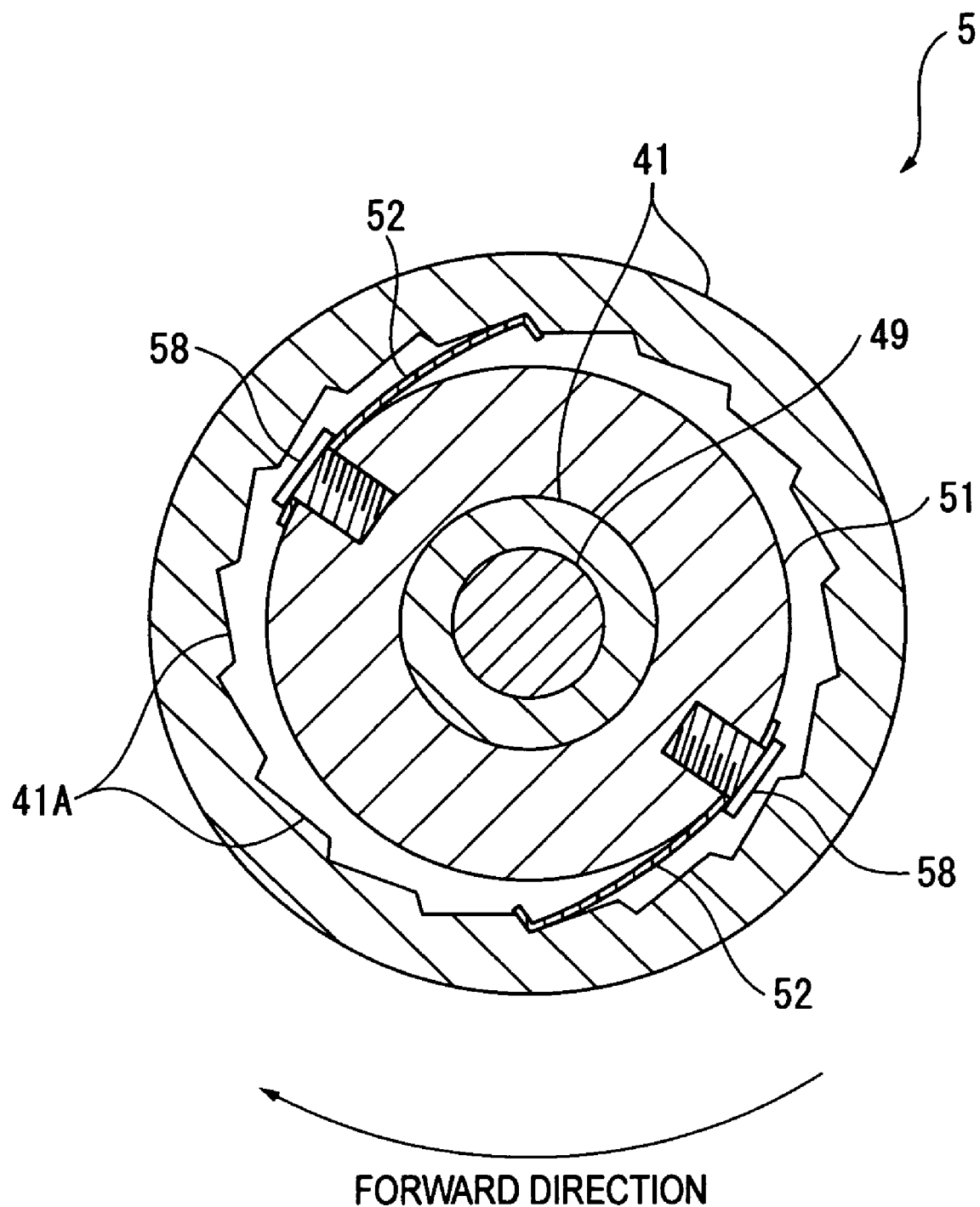
FIG. 4 is a cross section showing a ratchet mechanism of the above embodiment, which is taken along line IV-IV of FIG. 3.
Figure 5:
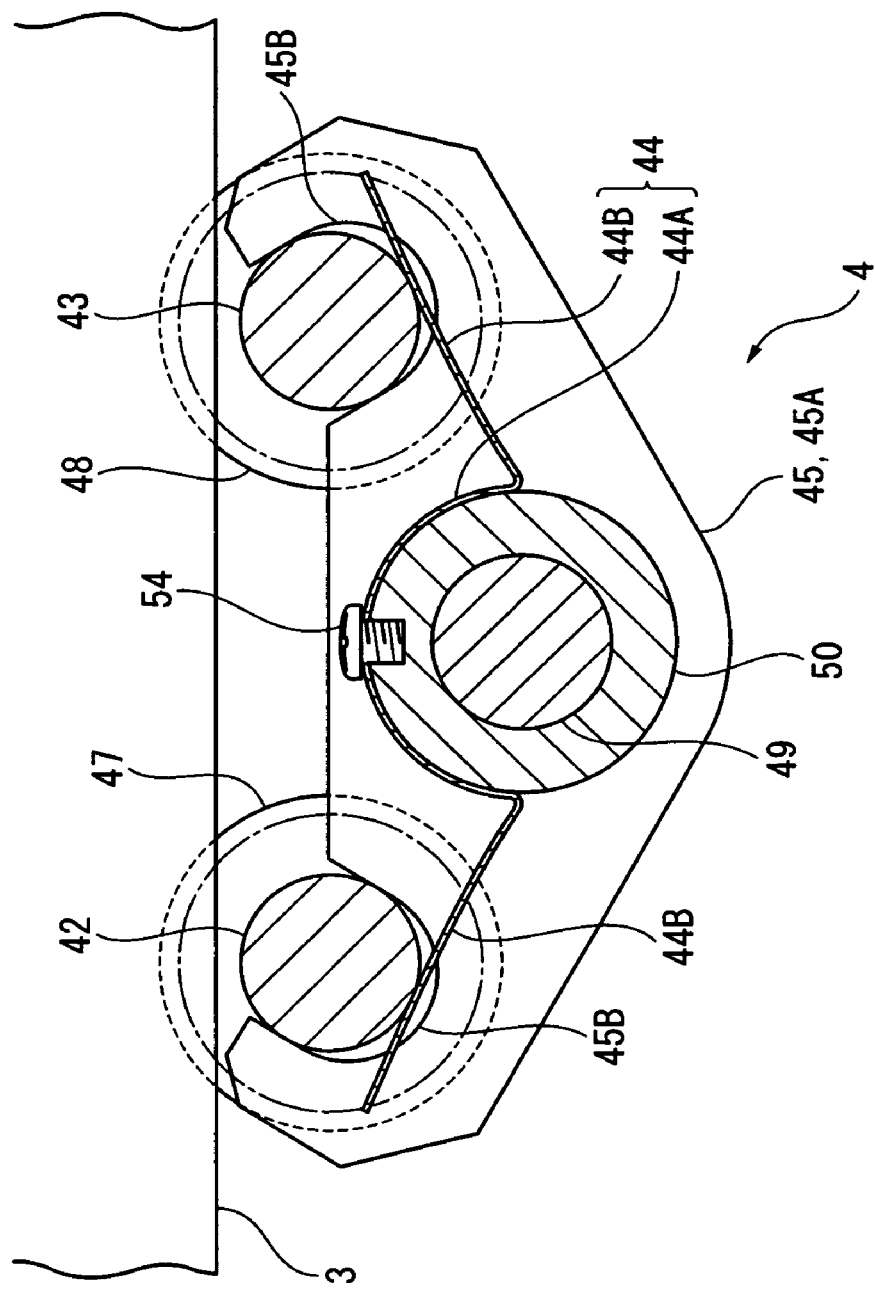
FIG. 5 is a cross section showing the feeding mechanism of the above embodiment, which is taken along line V-V of FIG. 3.
Figure 6:
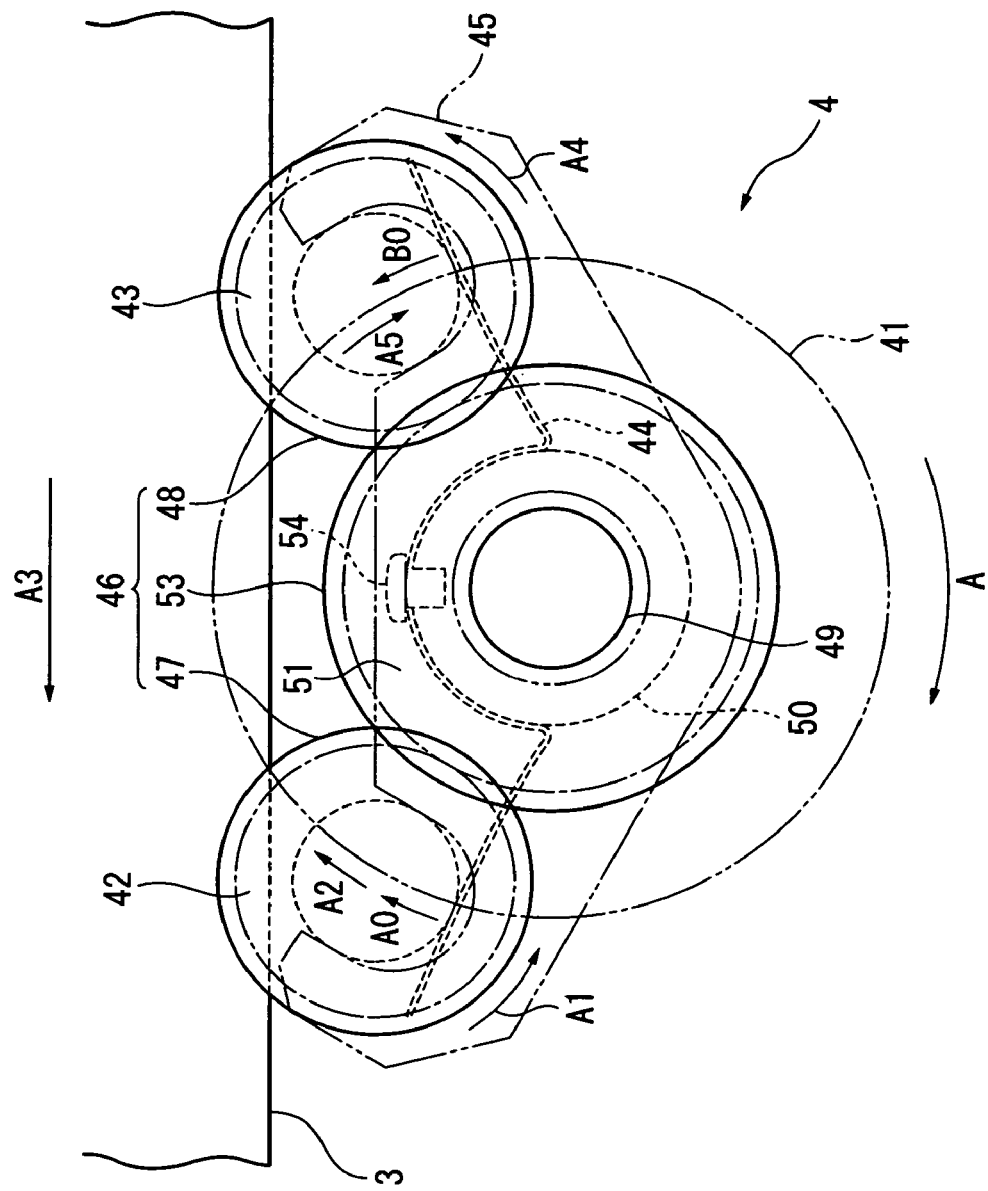
FIG. 6 is an illustration explaining a power transmitter of the above embodiment.
Figure 7:
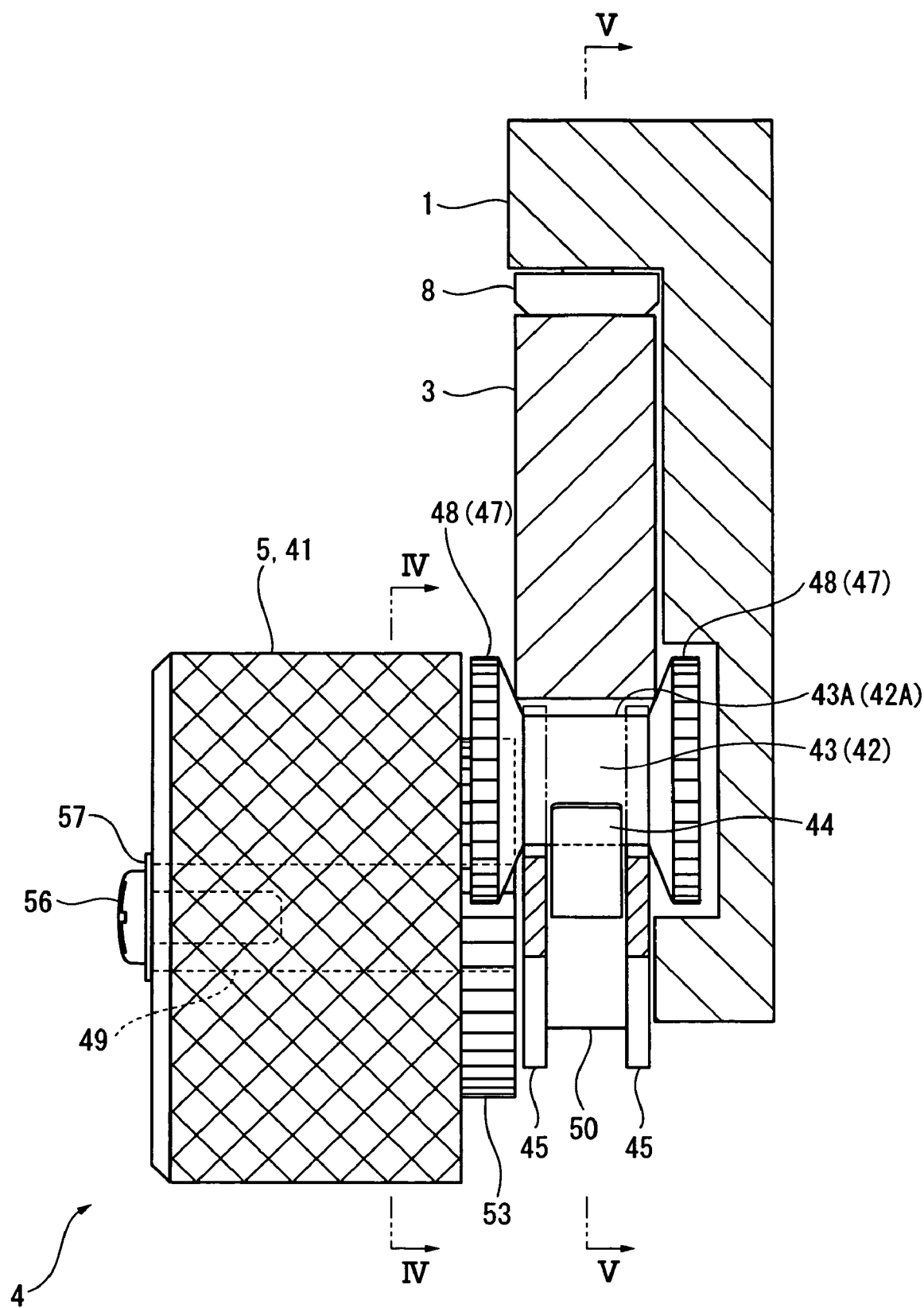
FIG. 7 is a cross section showing the feeding mechanism of the above embodiment, which is taken along line VII-VII of FIG. 2.

FIG. 1 is a front elevational view showing a measuring tool according to the embodiment. FIG. 2 is a partly enlarged view of a feeding mechanism of the measuring tool. FIG. 3 is a cross section taken along line III-III of FIG. 2. FIG. 4 is a cross section showing a ratchet mechanism, which is taken along line IV-IV of FIG. 3. FIG. 5 is a cross section taken along line V-V of FIG. 3. FIG. 6 is an illustration explaining a power transmitter. FIG. 7 is a cross section taken along line VII-VII of FIG. 2.

As shown in FIG. 1, the measuring tool of the present embodiment includes a U-shaped body frame 1, an anvil 2 provided on one end of the body frame 1, a slider 3 as a movable member provided on the other end of the body frame 1, a feeding mechanism 4 that moves the slider 3, an encoder (not shown) that detects a displacement of the slider 3, the encoder being arranged inside the other end of the body frame 1, a digital display 6 that digitally displays a detected value of the encoder, and a heat insulation cover 7 arranged on the other end of the body frame 1 and adapted to cover the slider 3, the heat insulation cover 7 being made of heat insulation material.

As shown in FIG. 2, the slider 3 is supported to the body frame 1 through a guide bushing 8. The slider 3 can be advanced/retreated relative to the anvil 2 in the axial direction.

The feeding mechanism 4 abuts on the slider 3 on a side opposite to a side of the guide bushing 8. The feeding mechanism 4 includes a ratchet mechanism 5, a forward feed roller 42 and a reverse feed roller 43 each rotatably supported around an axis parallel to the axis of the ratchet mechanism 5, roller holders 45 provided on the body frame 1, the roller holders 45 serving as feed roller holding members for respectively supporting the forward feed roller 42 and the reverse feed roller 43, a first leaf spring 44 that serves as a biasing mechanism for biasing the forward feed roller 42 and the reverse feed roller 43 toward the direction in which the forward feed roller 42 and the reverse feed roller 43 are brought into contact with the slider 3, and a power transmitter 46 that transmits the rotation of the ratchet mechanism 5 respectively to the forward feed roller 42 and the reverse feed roller 43.

As shown in FIG. 3, the ratchet mechanism 5 includes an outer roller 41 rotatably supported to the body frame 1, an inner roller 51 rotatably supported inside the outer roller 41, second leaf springs 52 each serving as a constant-pressure mechanism that transmits the rotation of the outer roller 41 to the inner roller 51 and, at the same time, allows the outer roller 41 to run idle relative to the inner roller 51 when a load acting on the inner roller 51 exceeds a predetermined value.

The measuring tool is provided with a stepped fixing shaft 49, of which one end is fixed to the body frame 1 by a nut 55. The outer roller 41 fits with the other end of the stepped fixing shaft 49 so as to be rotatably supported via a setscrew 56 and a flat washer 57 attached to the other end of the stepped fixing shaft 49. Further, saw-toothed projections 41A are formed on an inner periphery of the outer roller 41 as shown in FIG. 4.

The second leaf springs 52, which is formed in a thin plate shape, has one end thereof fixed on the outer peripheral face of the inner roller 51 by a setscrew 58 and the other end thereof engaged with the saw-toothed projections 41A of the outer roller 41. The second leaf spring 52 is inserted in a state biasing the outer roller 41 toward outside. The number of the second leaf spring 52 may be one or more than one (herein the number of the second leaf spring 52 is two).

The disposition of the forward feed roller 42 and the reverse feed roller 43 is shown in FIG. 2. The forward feed roller 42 is disposed between the outer roller 41 and the slider 3 at a position closer to the anvil relative to the outer roller 41 is, and the reverse feed roller 43 is disposed at a position remote from the anvil.

As shown in FIG. 3, there are two roller holders 45 respectively press-fitted onto two sides of an outer periphery of a cylindrical fixing member 50 press-fitted into a stepped fixing shaft 49. The two roller holders 45 respectively support the forward feed roller 42 and the reverse feed roller 43 so that the forward feed roller 42 and the reverse feed roller 43 can respectively move in a circumferential direction around the axis of the outer roller 41.

As shown in FIG. 5, the roller holder 45 includes a fixed portion 45A at the center thereof and two U-shaped supporters 45B at both ends of the fixed portion 45A, all of which are integrally formed. The U-shaped supporters 45B respectively bear the axes of the forward feed roller 42 and the reverse feed roller 43. The U-shaped supporters 45B each have a U-shaped groove so as to respectively guide the forward feed roller 42 and the reverse feed roller 43 movably in a circumferential direction around the axis of the stepped fixing shaft 49.

As shown in FIG. 5, the first leaf spring 44 is fixed to the center of the outer periphery of the fixing member 50 by a setscrew 54. The first leaf spring 44 includes, at the center thereof, a fixed portion 44A curved in an arc shape corresponding to the outer peripheral face of the fixing member 50, and two biasing portions 44B at both ends of the fixed portion 44A, all of which are integrally formed. The biasing portions 44B respectively bias the axes of the forward feed roller 42 and the reverse feed roller 43 supported by the roller holder 45 toward the direction in which the forward feed roller 42 and the reverse feed roller 43 are brought into contact with the slider 3.

As shown in FIG. 6, the power transmitter 46 includes a main gear 53 provided on the inner roller 51, first sub-gears 47 provided on the forward feed roller 42, and second sub-gears 48 provided on the reverse feed roller 43. The first sub-gears 47 and the second sub-gears 48 respectively mesh with the main gear 53.

As shown in FIG. 3, the main gear 53 is formed on one side of the outer periphery of the inner roller 51.

As shown in FIG. 7, the second sub-gears 48 are formed on both sides of the outer periphery of the reverse feed roller 43, and one of the second sub-gears 48 engages with the main gear 53. The reverse feed roller 43 can be assembled in an inverted manner according to necessity.

The reverse feed roller 43 has the trapezoidal groove 43A at the center of the outer periphery thereof. The section of the slider 3 has a rectangular cross section in a direction perpendicular to the longitudinal direction. Two side surfaces of the trapezoidal groove of the reverse feed roller 43 respectively contact two adjacent corners of the rectangular cross section.

The forward feed roller 42 is provided with the first sub-gears 47 and the trapezoidal groove 42A in the same manner as the reverse feed roller 43. In FIG. 7, reference numerals for portions of the forward feed roller 42 corresponding to those of the reverse feed roller 43 are respectively indicated in the parentheses.

In assembly, with such an arrangement, the fixing member 50 is press-fitted into the stepped fixing shaft 49 shown in FIG. 3, and the roller holder 45 is then press-fitted into the fixing member 50. The first leaf spring 44 is fixed to the fixing member 50 by the setscrew 54.

Next, the one end of the stepped fixing shaft 49 is inserted into the body frame 1 and fixed to the body frame 1 by the nut 55.

Next, as shown in FIG. 2, the forward feed roller 42 and the reverse feed roller 43 are respectively disposed on the roller holder 45, and the slider 3 is inserted from the other end of the body frame 1. At this time, the forward feed roller 42 and the reverse feed roller 43 should be biased against the first leaf spring 44 while the slider 3 is being inserted between the guide bushing 8 of the body frame 1 and the forward feed roller 42 and the reverse feed roller 43. Herein, the clearance between the slider 3 and the body frame 1 also can be adjusted through adjusting the screwing amount of the guide bushing 8.

Further, as shown in FIG. 4, one end of each the second leaf spring 52 is fixed to the outer periphery of the inner roller 51 by the setscrew 58, and then inserted inside the outer roller 41. At this time, the other end of each the second leaf spring 52 is engaged with the saw-toothed projections 41A formed on the inner periphery of the outer roller 41. In this manner, the ratchet mechanism 5 that includes the outer roller 41, the inner roller 51 and the second leaf springs 52 is assembled.

Finally, as shown in FIG. 3, the ratchet mechanism 5 is inserted into the other end of the stepped fixing shaft 49, and rotatably fixed to the stepped fixing shaft 49 by a setscrew 56 through a flat washer 57.

When performing measurement, the user holds the workpiece (not shown) with the left hand, grasps the body frame 1 with the right hand and rotates the outer roller 41 with the right thumb, so that the rotation of the outer roller 41 is transmitted respectively to the forward feed roller 42 and the reverse feed roller 43 through the ratchet mechanism 5.

As shown in FIG. 6, the forward feed roller 42 and the reverse feed roller 43 are supported by the roller holder 45 so that the forward feed roller 42 and the reverse feed roller 43 can respectively move along the circumference around the axis of the outer roller 41. Further, the forward feed roller 42 and the reverse feed roller 43 are respectively biased by the first leaf spring 44 in the directions indicated by the arrows A0 and B0 against the slider 3. Thus, actions of the forward feed roller 42 and the reverse feed roller 43 on the slider 3 will change in the following manner depending on the rotating direction of the outer roller 41.

First, when the outer roller 41 is rotated in the direction indicated by the arrow A, the forward feed roller 42 will rotate in the direction indicated by the arrow A1. At this time, since a contact surface of the main gear 53 of the outer roller 41 presses a contact surface of the first sub-gear 47 of the forward feed roller 42 toward the side of the slider 3, the forward feed roller 42 will be biased toward the direction in which the forward feed roller 42 is brought into contact with the slider 3 (the direction indicated by the arrow A2). In this manner, since the biasing force caused by the rotation of the outer roller 41 (indicated by the arrow A2) is applied to the forward feed roller 42 in the same direction as that of the biasing force of the first leaf spring 44 (indicated by the arrow A0), and since the forward feed roller 42 rotates, the slider 3 will be forward fed in the direction indicated by the arrow A3 by frictional force between the slider 3 and the forward feed roller 42.

Further, the reverse feed roller 43 is rotated in the direction indicated by the arrow A4. Since a contact surface of the main gear 53 of the outer roller 41 presses a contact surface of the second sub-gear 48 of the reverse feed roller 43 toward the direction away from the slider 3, the reverse feed roller 43 will be biased toward a direction away from the slider 3 (the direction indicated by the arrow A5). In this manner, since the biasing force caused by the rotation of the outer roller 41 (indicated by the arrow A5) is applied to the reverse feed roller 43 in an opposite direction to that of the biasing force of the first leaf spring 44 (indicated by the arrow B0), the reverse feed roller 43 will be moved in the direction away from the slider 3. Since the reverse feed roller 43 is moved away from the slider 3, it will not contribute to forward feeding the slider 3.

When the outer roller 41 is rotated in the direction opposite to the arrow A, since the forward feed roller 42 and the reverse feed roller 43 play roles opposite to those described above, the slider 3 will be reverse fed by the frictional force between the reverse feed roller 43 and the slider 3 when the reverse feed roller 43 rotates, and the forward feed roller 42 will not contribute to reverse feed of the slider 3 even when the forward feed roller 42 rotates.

Further, the displacement of the slider 3 is detected by an encoder (not shown), and then the detected value is digitally displayed on the digital display 6.

When the slider 3 is forward fed to a point at which the workpiece is held by the anvil 2 and the slider 3, since the slider 3 can not be forward fed further (namely, since the inner roller 51 can not be rotated in the same direction any more), the outer roller 41 will run idle relative to the second leaf spring 52 fixed inside the inner roller 51 of the ratchet mechanism 5. Thus the measurement can be performed with a constant measuring force by reading the displayed value of the digital display 6 at this time.

According to the present embodiment, the following advantages can be achieved.

(1) Since the forward feed roller 42 exclusively for performing the forward feed and the reverse feed roller 43 exclusively for performing the reverse feed are provided, the biasing force of the first leaf spring 44, which biases the forward feed roller 42 and the reverse feed roller 43 toward the direction in which the forward feed roller 42 and the reverse feed roller 43 are brought into contact with the slider 3, will not change no matter whether the forward feed is performed or the reverse feed is performed. Thus the slider 3 can be smoothly moved both in the forward direction and in the reverse direction.

(2) Since the user holds the workpiece with the left hand, grasps the body frame 1 with the right hand and rotates the outer roller 41 with the right thumb to move the slider 3, the operation can be easily performed with one hand.

(3) Constantly biased by the first leaf spring 44 toward the direction in which the forward feed roller 42 and the reverse feed roller 43 are brought into contact with the slider 3, the forward feed roller 42 and the reverse feed roller 43 are prevented from running idle relative to the slider 3 even when the outer peripheral faces thereof are worn, and thereby there is no concern that the measurement can not be performed.

(4) Formed by the main gear 53 and the first and the second sub-gears 47, 48, the power transmitter 46 can have a relatively simple structure as a power transmitter 46 built in the feeding mechanism 4. Also, by being combined with the first leaf spring 44, the outer peripheral faces of the forward feed roller 42 and the reverse feed roller 43 can be constantly biased toward the direction in contact with the slider 3. Further, since there is no slippage between the main gear 53 and the first and the second sub-gears 47, 48, the rotation of the outer roller 41 can be securely transmitted to the forward feed roller 42 and the reverse feed roller 43.

(5) Since the ratchet mechanism 5 is used, when the load applied to the inner roller 51 to hold the workpiece between the anvil 2 and the slider 3 exceeds a predetermined value, the outer roller 41 will run idle relative to the inner roller 51 owing to the second leaf spring 52, and thereby the measurement can be performed with a predetermined measuring force. Thus, fluctuation in measured value can be reduced, thereby ensuring high precision measurement.

(6) Since two side surfaces of each of the trapezoidal grooves 42A, 43A respectively formed on the outer peripheral face of each of the forward feed roller 42 and the reverse feed roller 43 respectively contact two adjacent corners of the rectangular cross section of the slider 3, the forward feed roller 42 and the reverse feed roller 43 can constantly be positioned at the center of the slider 3 in the axial direction of the forward feed roller 42 and the reverse feed roller 43. Thus the forward feed roller 42 and the reverse feed roller 43 can operate stably so as to smoothly move the slider 3.

(7) Since the ratchet mechanism 5 can be compactly configured with fewer components, assembly work can be facilitated, and cost can be reduced. Further, since the ratchet mechanism 5 is detachably attached to the body frame at one point by the setscrew 56, it can be easily exchanged.

(8) Since the ratchet mechanism 5 is configured by the outer roller 41 having the saw-toothed projections 41A formed on the inner periphery thereof, the inner roller 51 and the second leaf springs 52 inserted between the outer roller 41 and the outer peripheral face of the inner roller 51, the measuring force can be easily changed by simply exchanging the ratchet mechanism 5 if various ratchet mechanisms 5 each having specific biasing force of the second leaf spring 52 are previously prepared.

Incidentally, it is to be understood that the present invention is not limited to the embodiments described above, and various modifications and variations can be made as long as the objects of the present invention can be achieved.

For example, since the forward feed roller and the reverse feed roller are constantly biased by the first leaf spring (which serves as the biasing mechanism) toward the movable member (which is referred to as the slider in the above embodiment), slip of the movable member can be restricted even when the user leaves his hand off the outer roller during measurement. Further, a lock mechanism exclusively for preventing the movable member from moving against the body frame may be adopted, thereby enabling the measuring tool to perform measurement at high accuracy. Examples of the lock mechanism include a stop screw that is screwed into the body frame according to necessity, so that the tip end of the stop screw abuts on the movable member.

Although the power transmitter includes the main gear and the sub-gears according to the present embodiment, the power transmitter also can be of belt type or chain type. Further, although the outer periphery of each of the forward feed roller and the reverse feed roller, which abuts on the movable member (referred to as the slider in the above embodiment) of the present invention, is formed as a trapezoidal groove, the outer periphery may be flat, or may have an uneven face in order to obtain high frictional force.

Though the preferred embodiments and methods for implementing the present invention are described above, the present invention is not limited thereto. In other words, although the present invention is mainly illustrated and described based on specific embodiment thereof, it should be understood that various changes in the shape, material, quantity, and other details of construction can be made by those skilled in the art based on the embodiment described above without departing from the spirit and objects of technical characteristics of the present invention.

Accordingly, the description disclosed above, which gives specific shape, quantity and the like, is just an exemplary description to make the present invention well understood instead of being a definition of the limits of the invention, therefore the description based on a component name without part or all of the specific shape, material and the like is included in the present invention.

The priority application Number JP2005-281483 upon which this patent application is based is hereby incorporated by reference.

What is claimed is:

1. A measuring tool comprising:
    a U-shaped body frame;
    an anvil provided on one end of the body frame;
    a movable member supported on the other end of the body frame, the movable member being advanceable and retreatable relative to the anvil in the axial direction; and
    a feeding mechanism for feeding the movable member,
    the movable member being forward fed toward the anvil to hold a workpiece with the anvil and the movable member, where a dimension or a profile of the workpiece is measured from the displacement of the movable member;
    wherein the feeding mechanism includes:
    an outer roller rotatably supported on the body frame;
    a forward feed roller disposed between the outer roller and the movable member at a position closer to the anvil relative to the outer roller, the forward feed roller being rotatable around an axis parallel to the axis of the outer roller to forward feed the movable member;
    a reverse feed roller disposed between the outer roller and the movable member at a position remote from the anvil relative to the outer roller, the reverse feed roller being rotatable around another axis parallel to the axis of the outer roller to reverse feed the movable member;
    a feed roller holding member provided on the body frame, the feed roller holding member supporting the forward feed roller and the reverse feed roller in a manner respectively movable along a circumference around the axis of the outer roller;
    a biasing mechanism that respectively biases the forward feed roller and the reverse feed roller in a direction in which outer periphery of the forward feed roller and the reverse feed roller comes into contact with the movable member; and
    a power transmitter that connects the outer roller to the forward feed roller and the reverse feed roller respectively, so that the rotation of the outer roller is transmitted to the forward feed roller and the reverse feed roller.

2. The measuring tool according to claim 1,
    wherein the power transmitter includes: a main gear provided on the outer roller; and sub-gears respectively provided on the forward feed roller and the reverse feed roller, the sub-gears engaging with the main gear, and
    wherein the biasing mechanism biases the forward feed roller and the reverse feed roller in circumferential direction of the axis of the main gear.

3. The measuring tool according to claim 1,
    wherein the feeding mechanism includes: an inner roller rotatably supported on the body frame; and a constant-pressure mechanism that connects the inner roller and the outer roller, the constant-pressure mechanism transmitting the rotation of the outer roller to the inner roller and allowing the outer roller to run idle relative to the inner roller when more than predetermined load is applied on the inner roller, and
    wherein the power transmitter connects the inner roller with the forward feed roller and the reverse feed roller respectively.

4. The measuring tool according to claim 1,
    wherein the movable member has a rectangular cross section in a direction perpendicular to the longitudinal direction thereof, and
    wherein the forward feed roller and the reverse feed roller each have a trapezoidal groove on the outer circumference thereof, and two sides of the trapezoidal groove contact with two adjacent corners of the rectangular cross section of the movable member.

* * * * *